Nov. 21, 1950        C. M. YOUNG        2,530,417
DISSOLVING DEVICE FOR MULTIPLE PROJECTORS
Filed July 31, 1946
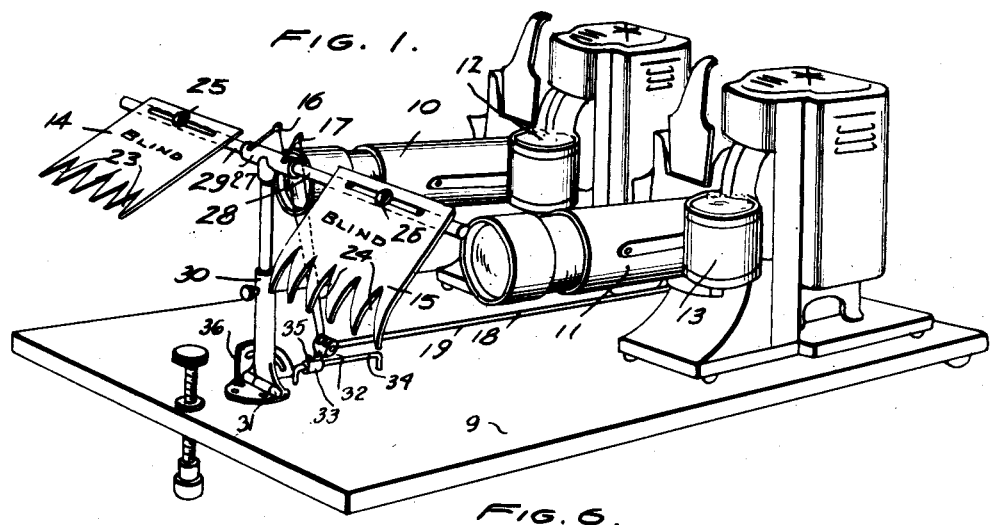
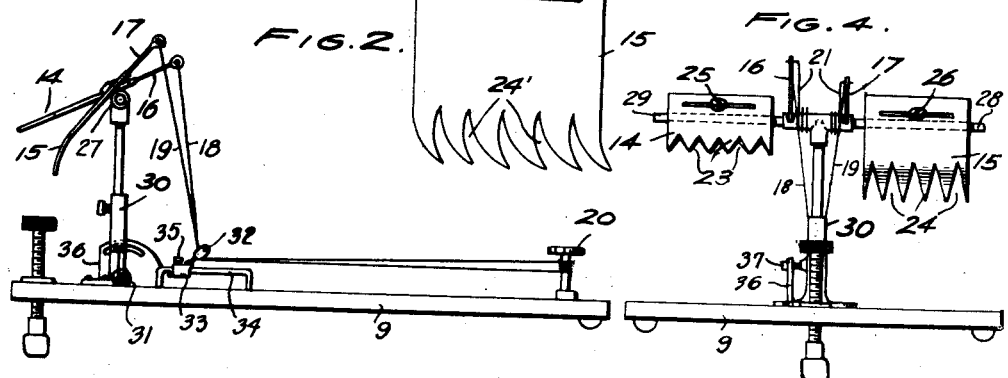
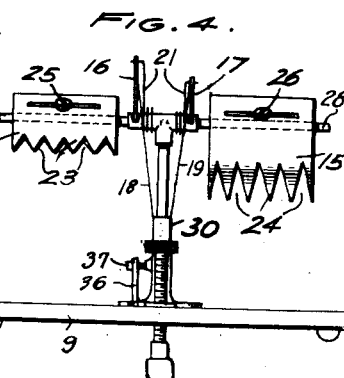
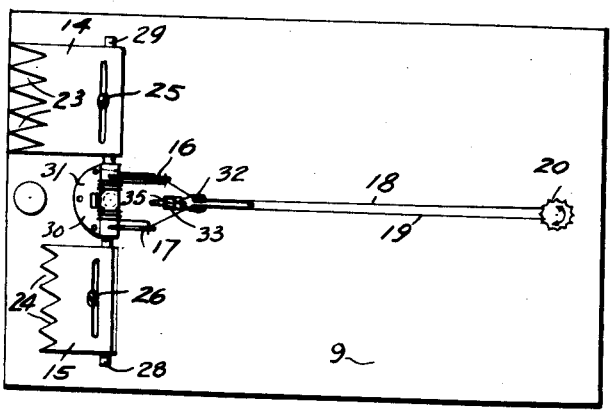
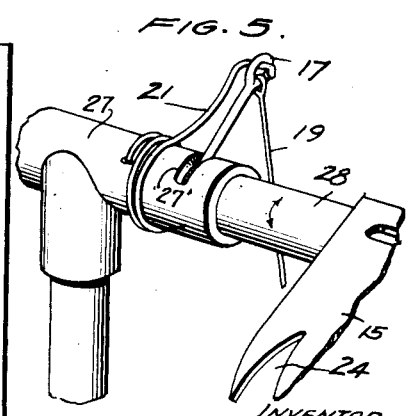
INVENTOR
CAREY M. YOUNG
BY William D. Hall
ATTORNEY Patented Nov. 21, 1950

2,530,417

UNITED STATES PATENT OFFICE 2,530,417

DISSOLVING DEVICE FOR MULTIPLE PROJECTORS

Carey M. Young, New York, N. Y.

Application July 31, 1946, Serial No. 687,503

5 Claims. (Cl. 88—28)

(Granted under the act of March 3, 1883, as amended April 30, 1928; 370 O. G. 757)

The invention described herein may be manufactured and used by or for the Government for governmental purposes, without the payment of any royalty thereon.

This invention relates to projectors and more particularly to projectors for selectively placing two pictures alternatively on the same screen. The main object of this invention is to provide for placing two different pictures on the same screen with means for varying the intensity of illumination of each picture thus projected so that the two may be made to fade in and out.

Other objects will become apparent as the description proceeds.

In carrying out this invention, I employ a pair of blinds having deeply serrated sweep ends which may be selectively raised and lowered in front of two projectors. These blinds in the present instance are operated by a common handle whereby when one is raised, the other is simultaneously lowered and therefore as one picture fades in, the other fades out.

In the drawings, Figure 1 is a perspective view of a twin projector on which my invention is installed, Figure 2 is a side view solely of the blind device, Figure 3 is a top view thereof omitting the projectors proper, Figure 4 is a front view of the invention, Figure 5 is a detailed view of the support for one of the blinds, and Figure 6 is a detailed plan of blank for a modified form of blind.

In the drawings, a rectangular base 9 is shown on which there are two identical projectors 10 and 11, side by side, which have respective slides or films at 12 and 13, which may show the same or different pictures respectively, preferably different pictures, the projectors being intended to be focused upon the same screen (not shown). Positioned in front of each projector are blinds 14 and 15 respectively, which are operated in opposite directions of rotation respectively by levers 16 and 17, which are respectively operated by end strands or reaches 18 and 19 of a cord which in turn is operated by the knob or handwheel 20, the middle portion of the cord being wound on the stem or shaft of the wheel 20 revolubly mounted on the baseboard of the appliance. Torsion springs 21 tend to pull the levers in a counter-clockwise motion. The cord however tends to either stop or limit movement by the springs or to rotate the levers clockwise, according as the knob is stationary or rotated, and therefore the angular positions of the shafts 28 and 29 are controlled by the rotation of knob 20.

Blinds 14 and 15 are fastened to the shafts 29 and 28 respectively by headed bolts 25 and 26 engaged through horizontal slits in the upper ends of the blinds and set in the shafts as means to adjust the blinds slidably along the shafts. The blinds 14 and 15 may be suitably positioned by moving them to the left or right while screws 25 and 26 are loose and thereupon fastening the screws. Blinds 14 and 15 have a series of deep V-shaped slots 23 and 24 which tend to control the shape of the light pattern falling upon the screen, as well as the degree or abruptness of the vignette produced.

It may be seen from the nature and proportions of the lens arrangement of Fig. 1 that the depth of these slots is slightly less than the diameter of the lens, and that a section of the bundle or beam of projected light rays representing the image of a slide will be a rectangle the vertical dimension of which at the place where the blinds project into the bundle will not be materially greater than the depth of the slots. On account of the width and depth of these slots, therefore, there will be a tendency for a diffused pattern of the same shape to be manifest in the illuminated field at the screen. This will aid in obscuring details of picture masses or other details of slide images as they are being dissolved, which is considered of advantage by lecturers. The obscuration does not necessarily consist of a complete exclusion of one of the pictures, which would tend to be too abrupt, whereas a gradual dissolving effect is desired, but results from a confusion of the details of substantial superposed parts of both pictures and the salients of shadow masses projected across the combined image, with variations of boundaries as two shadow masses move in opposite directions in the same area of the screen.

It should be noted that the shafts 28 and 29 are coaxial and horizontal, above the plane of the optical axes of the projectors at a vertical plane somewhat in advance of the lenses of the projectors. Thus the blinds when horizontal will be above the bundle of rays from the lenses defining the projection of a slide image at this location, and may swing down to bring their serrated ends across the bundle of rays and farther, to completely cut off the projected illumination.

The blind 15 has its slotted portion bent downward and back toward the projector 11. This gives an unusual effect upon the screen. Another way of obtaining an unusual effect upon the screen is to have the slots 24 curved as shown at 24' in Figure 6, and in this figure the blind is not bent but is all in one plane.

In operating this invention, appropriate slides or films are placed at 12 and 13 and projected by projectors 10 and 11. The knob 20 may be operated to cause the two pictures to fade in and out. For example, when blind 14 is raised, a greater portion of the picture of projector 10 is transmitted to the screen and by lowering of blind 15 (which necessarily occurs at the same time in the particular device shown) a lesser portion of the picture from projector 11 appears.

By having one blind cut straight and the other bent (see Figure 2), or having slightly curved cuts (see Figure 6), deep shadows on the screen defining significant details of an image are quickly eliminated or at least obscured and therefore there is a subtle blending of the two pictures. The blinds may also be raised and lowered through use of the telescoping standard or mount and set screw arrangement 30.

The standard 30 includes a tubular base member hinged at 31 on the base 9 to swing in a vertical plane parallel to the axes of the projectors. The upper part of the standard is a T-shaped member having its stem inserted in the tubular base member and having a cylindrical cross head 27 in the ends of which the shafts 28 and 29 are respectively inserted. The cross head thus constitutes a bearing for each shaft. Near each end a slot 27' is formed in the cross head and the levers 16 and 17 are inserted through these and in the respective shafts so that the levers may oscillate in the slots for operation of the blinds as described, and also serve to retain the shafts in their bearings.

The swinging of the standard 30 on the hinge 31 permits bringing the blinds nearer to or farther from the lenses of the projectors. This will enable regulation of the vignetting effect, and also enable varying of the definition of any pattern of shadows which the serrated edges of the blinds may tend to produce by reason of the exceptional depth of the serrations as compared to the diameter of the part of the bundle of rays intersected by the blinds. To enable this swinging of the blind mount on the hinge 31 without disturbing the positions of the blinds excessively by varying of the linear distance from the arms 16—17 to the reeling and unreeling device 29 by which the cable ends are operated, the reaches of the cable are passed around a double pulley 32 mounted close to the base of the standard 30. This pulley is attached to a slide 33 carried on a horizontal rectilinear guide 34, mounted on the base 9 coincident with the plane in which the standard 30 swings for adjustment. The pulley may be adjusted on the guide 34 to take up slack in the cable, and is secured in adjusted positions by means of a binding screw 35 on the slide 33. To secure the telescoping standard in its angular adjustments on the hinge 31, a vertical sector plate 36 is mounted on the base 9 parallel to the plane in which the mount 30 swings, this plate having a slot therein concentric with the axis of the hinge, and receiving therethrough a binding screw 37 threadedly engaged in the base member of the mount 30 and having a head to bind against the plate 36 when screwed inward a proper distance.

I claim:

1. In an optical image projector device, a pair of projectors having substantially parallel optical axes and lenses of common focal length, said projectors each having a beam of projection light; a first revoluble shaft parallel to a plane through said axes, in advance of one of said projectors, above and transverse to the beam of projection light of the latter; a second revoluble shaft colinear with and revoluble independently of said first shaft and in advance of the other of said projectors; means to rotate said shafts simultaneously in opposite directions at will; a first blind of sheet material wider than the width of the beam of projection light fixed to and substantially colinear with said first shaft, for gradual occlusion of the projection light when said first shaft is revolved from an initial position with its blind clear of the beam of projection light; a second similar blind similarly fixed to said second shaft for gradual passing of the adjacent beam of projection light when said second shaft is revolved in opposite direction to the said motion of said first shaft, from an extreme with the second blind in projection light occluding position; each blind at its beam-entering edge having generally V-shaped notches of a depth equalling a major part of the cross sectional dimension of the adjacent beam of projection light, said notches being few in number to form perceptible moving areas of light and shadow across substantial parts of a projected image while the swinging edges of the blinds are moving in the beams of projection light, so that under movement of one blind into one said beam and simultaneous movement of the other blind oppositely in the other said beam, oppositely moving irregular shadow masses will appear in the same and substantial portions of a combined image formed by the two projectors.

2. The structure of claim 1 in which said blinds are slidably adjustable along the said shafts for a distance at least equal to the major corresponding dimension of said notches, and means to secure the blinds at adjusted positions on the shafts.

3. The structure of claim 1 in which bearings are included for the shafts, a base, an upstanding mount for the bearings hinged on said base on an axis parallel to said shafts and spaced substantially below said plane of the optical axes, and means to secure the said mounts at adjusted positions in their pivotal movements on said axis.

4. The structure of claim 1 wherein said means to rotate said shafts comprises a torsion means tending to rotate the shafts in one direction, a radial arm on each said shaft, a distant reeling and unreeling device, a cable having its middle part engaged on the reeling and unreeling device and its ends connected respectively to said arms of said shafts under tension opposing said torsion means, a guide for the cable end portions adjacent said hinge axis, and means to operate the reeling and unreeling device at will.

5. The structure of claim 1 wherein a mounting for said shafts is included, said means to rotate the shafts comprising yieldable torsion means on the mount engaged with the shafts, tending to rotate the same in one direction, and manual means for controlling rotation of the shafts and to move either against the torsion means at will.

CAREY M. YOUNG.

REFERENCES CITED

The following references are of record in the file of this patent:

UNITED STATES PATENTS

| Number | Name | Date |
|---|---|---|
| 837,942 | Martincourt | Dec. 11, 1906 |
| 941,732 | Ashley | Nov. 30, 1909 |
| 1,144,108 | Buttner et al. | June 22, 1915 |
| 1,247,646 | Craig | Nov. 27, 1917 |
| 1,456,544 | Fleming | May 29, 1923 |
| 1,718,782 | Greim | June 25, 1929 |
| 1,738,943 | Brenkert et al. | Dec. 10, 1929 |
| 1,981,829 | Stiriss | Nov. 20, 1934 |
| 2,148,508 | Seitz | Feb. 28, 1939 |
| 2,305,664 | Bogopolsky | Dec. 22, 1942 |

FOREIGN PATENTS

| Number | Country | Date |
|---|---|---|
| 22,981 | Great Britain | of 1900 |
| 681,656 | France | Feb. 3, 1930 |
| 663,815 | Germany | Aug. 13, 1938 |